(12) United States Patent
Jessop (10) Patent No.: US 9,380,739 B2
(45) Date of Patent: *Jul. 5, 2016

(54) METHODS AND USES FOR IMPROVED SOWING OF SEEDS

(71) Applicant: Exosect Limited, Winchester, Hampshire (GB)

(72) Inventor: Nicholas Jessop, Winchester (GB)

(73) Assignee: Exosect Limited, Winchester (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/375,361

(22) PCT Filed: Apr. 3, 2013

(86) PCT No.: PCT/GB2013/000153

§ 371 (c)(1),
(2) Date: Jul. 29, 2014

(87) PCT Pub. No.: WO2013/150261

PCT Pub. Date: Oct. 10, 2013

(65) Prior Publication Data

US 2015/0013221 A1 Jan. 15, 2015

(30) Foreign Application Priority Data

Apr. 4, 2012 (GB) .................... 1206138.8
Apr. 4, 2012 (GB) .................... 1206139.6
Apr. 4, 2012 (GB) .................... 1206141.2
Apr. 4, 2012 (GB) .................... 1206142.0
Apr. 4, 2012 (GB) .................... 1206143.8
Apr. 4, 2012 (GB) .................... 1206144.6

(51) Int. Cl.
*A01C 1/06* (2006.01)
*A01G 1/00* (2006.01)

(52) U.S. Cl.
CPC .. *A01C 1/06* (2013.01); *A01G 1/001* (2013.01)

(58) Field of Classification Search
None
See application file for complete search history.

(56) References Cited

U.S. PATENT DOCUMENTS

| | | | | |
|---|---|---|---|---|
| 3,621,612 A | * | 11/1971 | Porter | A01C 1/06 111/900 |
| 4,285,994 A | * | 8/1981 | Pearce et al. | 427/222 |
| 5,127,185 A | * | 7/1992 | Kojimoto et al. | 47/57.6 |
| 5,876,739 A | | 3/1999 | Turnblad et al. | |
| 2007/0207927 A1 | * | 9/2007 | Rosa et al. | 504/100 |
| 2014/0274682 A1 | * | 9/2014 | Wu et al. | 504/100 |
| 2015/0072857 A1 | * | 3/2015 | Reichert et al. | 504/100 |

FOREIGN PATENT DOCUMENTS

| | | |
|---|---|---|
| GB | 417 501 A | 9/1934 |
| GB | 830 655 A | 3/1960 |

(Continued)

OTHER PUBLICATIONS

Carnauba Waxes <http://www.brenntagspecialties.com/en/downloads/Products/Multi_Market_Principals/Koster_Keunen/Ink_Waxes/Carnauba_Wax_103_104_105_TDS.pdf> accessed on Mar. 16, 2015.*

(Continued)

*Primary Examiner* — Mandy Louie
(74) *Attorney, Agent, or Firm* — Sughrue Mion, PLLC (57) ABSTRACT

Methods and uses of controlling the flowability of a population of plant seeds and dust drift therefrom by placing individual seeds in contact with particles of a flowability enhancing agent that is made up of at least one species of wax that adheres more firmly to the said plant seeds than a compound or composition that comprises a substance that is or includes a mineral earth component.

12 Claims, 4 Drawing Sheets

(56) References Cited

FOREIGN PATENT DOCUMENTS

| | | |
|---|---|---|
| WO | 2005/077169 A1 | 8/2005 |
| WO | 2011/148144 A1 | 12/2011 |

OTHER PUBLICATIONS

International Search Report for PCT/GB2013/000153 dated Aug. 22, 2013.
Search Report for British Application 1306086.8 dated Aug. 5, 2013.

* cited by examiner

METHODS AND USES FOR IMPROVED SOWING OF SEEDS

CROSS REFERENCE TO RELATED APPLICATIONS

This application is a National Stage of International Application No. PCT/GB2013/000153 filed Apr. 3, 2013, claiming priority based on British Patent Application Nos. 1206139.6, 1206141.2, 1206142.0, 1206143.8, 1206144.6 and 1206138.8 filed Apr. 4, 2012, the contents of all of which are incorporated herein by reference in their entirety.

The present invention relates to improvements in methods of controlling seed flowability and dust drift, uses of formulations or compositions for controlling flowability and dust drift, and improved methods of sowing seed. In particular, the present invention relates to improvements in methods of enhancing seed flowability and controlling dust drift, uses of formulations or compositions for enhancing flowability and controlling dust drift and improved methods of sowing seed wherein dust drift is decreased.

There exist problems associated with the sowing of seed using conventional sowing equipment, such as dust drift and seed flowability. 'Dust drift' is a term of the art and relates to inter alia frictional erosion between seeds causing the loss of elements of the seed coat per se through the rubbing together of seeds during haulage and storage movement which results in a dust made up inter alia of very small parts of the seed coat. The damage caused by friction to the seeds causes a loss of viability to a significant fraction of the seeds in any one batch which in turn leads to agronomic losses. The generated dust is lost to the environment through wind dispersal when seeds are loaded into seed planters and during planting operations from commercial planting machinery, and the like. Other forms of dust making up dust drift occur when prior-coated or prior-pelleted seed is subject to haulage and storage where again, damage caused by frictional erosion within seed masses leads to the formation of dust that gets into the environment. Coated or pelleted seed generally includes active agents such as pesticides and/or fertilisers and in these forms dust loaded with such active agents gets into the environment and can be spread far and wide. Indeed, it is known that dust drift that contains pesticides is responsible for harming and killing social insect populations beneficial to man, such as domesticated bee populations. Dust drift is also thought to be responsible inter alia for the rise in the number of cases of asthma and other respiratory diseases in humans and is suspected of contributing to a rise in incidence of certain cancers.

For the purposes of the present invention, "Seed flowability" relates to the ability of individual seeds in a seed population to flow or slide past each other. The ease of seed flowability is important in many situations such as in the use of conventional seed sowing equipment and in the use of seed storage equipment. The greater the degree of ease of flowability of seed means that seed flow can be controlled better and so germination losses due to damage to the seed coat or due to seed clumping causing blockages in conventional sowing equipment can be minimised. Conventional crop seed typically uses a mineral earth component such as talc, diatomaceous earth or kaolin as a drying agent which also acts as a flowability agent, however, such mineral earth components tend to detach from plant seeds over time.

Furthermore, such drying agents tend to cause clumping of seeds within the seed mass and as a result the clumping of seed gives rise to blockages in sowing equipment, making the sowing process less efficient. Furthermore, plant seed coating compositions tend to be added to plant seeds in the form of wet slurry which then requires drying either through the application of heat and/or the addition of further mineral earth components such as talc, kaolin or diatomaceous earth. Either way, the finished coated seed product is subjected to frictional forces during haulage, storage and sowing which results in the added seed coatings being damaged and so contributes to clumping of the seeds and concomitant losses in germination efficiency.

Commercial preparations of coated seeds such as Poncho® (Bayer) comprising pesticides are available that are alleged to be free flowing but such preparations tend to have complex coatings that inter alia make use of several polymer layers and other components that are expensive to produce.

There exists a need to provide seeds for planting that have improved flowability and improved dust drift control over conventional seeds.

According to the present invention, there is provided a method of controlling the flowability of plant seeds by placing the plant seeds of a mass of seeds in contact with dry free flowing particles of a flowability enhancing agent that is made up of at least one species of electret particle made up of a wax, wherein the electret particle adheres more firmly to the plant seeds than do particles that comprise a dry free flowing substance that is or includes a mineral earth component.

Typically, the control of flowability of a population of plant seeds is enhanced, that is to say, the seeds are more free-flowing than conventional plant seed populations, and exhibit reduced clumping of seeds within the seed mass than conventional plant seed populations.

The plant seeds, whether pre-coated or coated with other polymers or uncoated, are placed in contact with a the flowability enhancing agent in powdered form. The flowability enhancing agent is made up of electret particles made up of a wax material as herein defined, and does not contain other flowability agents such as particles comprising inorganic materials such as mineral earths, such as kaolin, diatomaceous earth, talc and the like.

Reference to "seed" and "seeds" is used interchangeably herein and means plant seeds selected from fodder and forage plant seeds, cereal seeds, cotton seeds, legume plant seeds, maize seeds, and field crop plant seeds, typically such seeds are viable seeds, to which compositions of use in the invention may be applied. Plant seed as provided herein means seeds that are capable of germinating to at least conventional levels of germination typical of the relevant plant species under consideration. Thus, a plant seed of use in a method or use of the invention is one that may be grown for industrial purposes, human and/or domesticated farm animal consumption.

Thus, for the purposes of the present invention it is to be understood that the term "seed" or "seeds" herein refers to seeds produced from plants that are of commercial importance.

Cereal seeds suitable for coating with compositions of use in the invention include seeds of rice (*Oryza sativa*), wheat (*Triticum* spp. such as *T. aestivum*) including species such as spelt (*T. spelta*), einkorn (*T. monococcum*), emmer (*T. dicoccum*) and durum (*T. durum*), barley (*Hordeum vulgare*) including two row and six row barley, sorghum (*Sorghum bicolor*), millet species such as pearl millet (*Pennisetum glaucum*), foxtail millet (*Setaria italica*), proso millet (*Panicum Secale cereale miliaceum*) and finger millet (*Eleusine coracana*), oats (*Avena sativa*), rye (*Secale cereale*), Triticale (x *Triticosecale*), buckwheat (*Fagopyrum esculentum*).

For the purposes of the present invention it is to be understood that the term "cotton plant seed" refers to commercially used seeds of the family Malvaceae, typically *Gossypium* seeds which are collectively referred to herein as "cotton plant seeds" unless context demands otherwise. Cotton seeds suitable for coating with compositions of use in the invention include cotton seeds of the family Malvaceae and include representative species such as *Gossypium hirsutum* (90% of world cotton production), *Gossypium barbadense* (8% of world cotton production), and *Gossypium arboreum* (2% of world cotton production).

For the purposes of the present invention it is to be understood that the term "legume plant seed" refers to seeds of leguminous plants. Legume plant seeds suitable for coating with compositions of use in the invention include seeds of legume species of the family Fabaceae that includes species such as Alfalfa (*Medicago sativa*), Austrian winter pea (*Pisum sativum*), Berseem clover (*Trifolium alexandrinum*), Black medic (*Medicago lupulina*), Chickling vetch/pea (*Lathyrus sativus*) Cowpea (*Vigna unguiculata*), Crimson clover (*Trifolium incarnatum*), Field peas (*Pisum sativum* subsp. *arvense*), Hairy vetch (*Vicia villosa*), Horse beans (*Vicia faba*), Kura clover (*Trifolium ambiguum*), Mung beans (*Vigna radiate*), Red clover (*Trifolium pratense*), Soya beans (*Glycine max*), Subterranean clover (*Trifolium subterraneum*), Sunn hemp (*Crotalaria juncea* L), White clover (*Trifolium repens*), White sweet clover (*Melilotus alba*), Woolypod vetch (*Vicia villosa* ssp. *dasycarpa*), Yellow sweet clover (*Melilotus officinalis*), Adzuki bean, (*Vigna angularis*, syn.: *Phaseolus angularis*), Broad bean (*V. faba* var. *major*), field bean (*Vicia faba*), Vetch (*Vicia sativa*), Common beans (*Phaseolus vulgaris*), including green beans, runner beans, haricot beans and the like, Chick pea (*Cicer arietinum*), Guar bean (*Cyamopsis tetragonoloba*), Hyacinth bean (*Dolichos lablab*), Lentil (*Lens culinaris*), Lima bean (*Phaseolus lunatus*), Lupin (*Lupinus* spp.), Mung bean (*Vigna radiata*, syn.: *Phaseolus aureus*), Pea (*Pisum sativum*), Peanut (*Arachis hypogaea*), Pigeon pea (*Cajanus cajan*), Tepary bean (*Phaseolus acutifolius*) and the like.

For the purposes of the present invention it is to be understood that the term "maize seed" refers to any kind of maize seed from a *Zea mays* plant that is for food-related production or other industrial purpose such as starch production, bio-fuel manufacture, typically ethanol manufacture, animal fodder production and the like. Examples of *Zea mays* varieties used in industry include flour corn (*Zea mays* var. *Amylacea*); popcorn used as a food and in packaging materials (*Zea mays* var. *Evert*); flint corn used for hominy production (*Zea mays* var. *Indurate*); sweet corn used as a food (*Zea mays* var. *saccharata* and *Zea mays* var. *Rugosa*); Waxy corn used in producing food thickening agents, in the preparation of certain frozen foods, and in the adhesive industry (*Zea mays* var. *Ceratina*); Amylomaize maiz used in the production of bio-degradeable plastics (*Zea mays*); and striped maize used as an ornamental (*Zea mays* var. *Japonica*).

Maize is also known as "corn" and these two terms may be used interchangeably unless context demands otherwise.

For the purposes of the present invention it is to be understood that the term "field crop plant seed" refers to "oilseeds" and "vegetable seeds" which are collectively referred to herein as "field crop plant seeds" unless context demands otherwise.

Field crop plant seeds suitable for coating with compositions of use in the invention include oil seeds of the Crucifer family such as canola (*B. campestris*) and oilseed rape (*B. napus*); seeds of other Crucifer plant species including those of plants of the *B. oleraceae* such as seeds of types of cabbages, broccolis, cauliflowers, kales, Brussels sprouts, and kohlrabis; seeds of alliums including onion, leek and garlic. Other field crop plant seeds suitable for coating with compositions of use in methods of, and in uses of the invention include capsicums, tomatoes, cucurbits such as cucumbers, cantaloupes, summer squashes, pumpkins, butternut squashes, tropical pumpkins, calabazas, winter squashes, watermelons, lettuces, zucchinis (courgettes), aubergines, carrots, parsnips, swedes, turnips, sugar beet, celeriacs, Jerusalem artichokes, artichokes, bok choi, celery, Chinese cabbage, horse radish, musk melons, parsley, radish, spinach, beetroot for table consumption, linseed, sunflower, safflower, sesame, carob, coriander, mustard, grape, flax, dika, hemp, okra, poppy, castor, jojoba and the like.

Fodder crop plant seed of use in a method or use of the invention is seed that may be grown as a stock feed for further processing such as in bio-fuel production, processed animal feed production, field planting for farm animal consumption and the like.

For the purposes of the present invention it is to be understood that the term "fodder crop plant seed" refers to fodder crop plant seeds suitable for coating with compositions of use in the invention and includes species of the Poaceae, including *Lolium* spp such as Italian Ryegrass, Hybrid Ryegrass, and rye grasses such as perennial ryegrass (*Lolium perenne*); *Festuca* species such as red fescue, fescue, meadow fescue, Tall fescue, Lucerne Fescue, and the forage herbs such as chicory, Sheep's Burnett, Ribgrass (aka Robwort Plantain), Sainfoin, Yarrow, Sheep's Parsley and the like.

A flowability enhancing agent is made up of electret particles and is one that reduces the level of clumping in a seed population, such as a batch of seeds that is destined for sowing. Suitable flowability enhancement agents of use in the invention are waxes selected from natural, synthetic and mineral waxes. Typically, waxes of use as flowability enhancing agents in the invention have a melting temperature of $\geq 40°$ C., depending on design. Preferably, waxes of use in the invention include waxes having a melting point of preferably $\geq 50°$ C., and most preferably are made up of so-called hard waxes having a melting point of $\geq 70°$ C. Examples of natural waxes of use in the present invention include carnauba wax, beeswax, Chinese wax, shellac wax, spermaceti wax, myricyl palmitate, cetyl palmitate, candelilla wax, castor wax, ouricury wax, wool wax, sugar cane wax, retamo wax, rice bran wax and the like.

Synthetic waxes of use as flowability enhancing agents in the present invention include suitable waxes selected from paraffin wax, microcrystalline wax, Polyethylene waxes, Fischer-Tropsch waxes, substituted amide waxes, polymerized α-olefins and the like.

Mineral waxes of use as flowability enhancing agents in the invention include montan wax (e.g. Lumax® Bayer) ceresin wax, ozocerite, peat wax and the like. More preferably, the wax of use in the method of the invention comprises at least one species of wax selected from carnauba wax, montan wax, and paraffin wax or a mixture of two or more thereof.

The particles of flowability enhancing agent are added as a powder to plant seeds as a formulation of dry particles, preferably of an appropriate known volume mean diameter for the seed type to which the formulation is being added. The plant seeds may comprise pre-coated seed, partially coated seed or untreated seed, that is to say, naked seed to which a coating formulation or coating composition has not been applied prior to the addition of the flowability enhancing agent. Preferably, the flowability enhancing agent is added to a mass of plant seeds that is made up of untreated seed. The flowability enhancing agent in the form of dry particulates is simply admixed into the mass of seeds which is then gently agitated or stirred until the mixing is complete and the seeds are observed to be free flowing. The size of the particles of flowability enhancing agent typically have a volume mean diameter of any conventional size, such as up to 200 µm, preferably from 10-100 µm, and most preferably from 10-50 µm depending on the type and size of plant seed that the particles are being applied to. Generally, the particles of use in the invention possess a volume mean diameter of ≥10 µm, such as in the range of from ≥10 µm to 200 µm, for example from ≥10 µm to 100 µm; or from ≥10 µm to 40 µm; or from ≥10 µm to 30 µm or any desired volume mean diameter value in between. Preferably, dry powder formulations or compositions of the invention comprise particles having a volume mean diameter of ≥10 µm, for example of 10 µm, 11 µm, 12 µm, 13 µm, 14 µm, 15 µm and the like up to any volume mean diameter of choice, such as up to 200 µm or any volume mean diameter in between for example 40 µm or 30 µm. In one preferment, compositions of the invention comprise electret particles having a volume mean diameter of from about 12 µm to 200 µm. One advantage of such formulations or compositions of the invention is that they are observed to limit dust drift from the seeds. A further advantage is that are also considered to be less of a thoracic hazard to humans and are not thought to be allergenic.

Preferably still, the flowability enhancing agent typically does not include added further components such as added UV blockers or added antioxidants or the like. The flowability enhancing agent of use in the present invention may be made up of a mixture of one or more waxes of use in the invention in dry powder form that have a melting point at or above 40° Centigrade as herein described. Suitable mixtures of waxes may include any combination of two or more waxees selected from natural, synthetic, and mineral waxes, such as, carnauba wax and montan wax; montan wax and paraffin wax; carnauba wax and montan wax; and the like. Alternatively, the particles of wax used as flowability enhancing agents of use in the invention may be made out of two or more waxes through melting and then mixing together in the molten state. Once the molten state cools down and solidifies, the resulting composite block may be broken up and kibbled and comminuted to size conventionally as outlined herein below. In a further alternative, particles of use in the invention may be made by compressing two or more sets of particles or sheets of flowability enhancing agents together, forming a composite structure or block that may then be broken up and kibbled and comminuted to size before being applied to a seed mass. Thus, flowability enhancing agents of use in the invention may be applied as a coating composition to plant seeds by
i) obtaining organic material as a dry powder formulation of separate particles of a pre-determined VMD; and
ii) applying the said population of particles to plant seeds.

The skilled addressee will also appreciate that the pre-determined VMD will be appropriate to the plant seed to which the coating is to be applied.

The skilled addressee will appreciate that a method of coating a plant seed with a coating composition that comprises a flowability enhancing agent of use in the invention, typically comprises
i) obtaining at least one flowability enhancing agent suitable for coating plant seeds;
ii) heating the flowability enhancing agent so as to form a liquid phase or a gaseous phase;
iii) cooling the liquid phase or gaseous phase of ii) to below the melting point of the flowability enhancing agent, forming a solid;
iv) machining the solid flowability enhancing agent of step iii) into particles of a pre-determined VMD as herein defined; and
v) applying the particles of iv) to plant seeds.

"Plant seeds" and "plant seed" is used interchangeably herein and means plant seeds selected from fodder and forage plant seeds, cereal seeds, cotton seeds, legume plant seeds, maize seeds, and field crop plant seeds, typically such seeds are viable seeds, to which formulations or compositions of use in the invention may be applied. Depending on design, the plant seeds may be viable (e.g. for planting purposes), or not viable (for example, after washing for use in beer or lager production; for milling into flour, or as feedstock for other industrial processes). Preferably, plant seed as provided herein means seeds that are capable of germinating to at least conventional levels of germination typical of the relevant plant species under consideration. Thus, a plant seed of use in a method or use of the invention is one that may be grown for industrial purposes, including seed production, human and/or domesticated farm animal consumption.

Thus, for the purposes of the present invention it is to be understood that the term "seed" or "seeds" herein refers to seeds produced from plants that are of commercial importance.

Cereal seeds suitable for coating with compositions of use in the invention include seeds of rice (*Oryza sativa*), wheat (*Triticum* spp. such as *T. aestivum*) including species such as spelt (*T. spelta*), einkorn (*T. monococcum*), emmer (*T. dicoccum*) and durum (*T. durum*), barley (*Hordeum vulgare*) including two row and six row barley, sorghum (*Sorghum bicolor*), millet species such as pearl millet (*Pennisetum glaucum*), foxtail millet (*Setaria italica*), proso millet (*Panicum miliaceum*) and finger millet (*Eleusine coracana*), oats (*Avena sativa*), rye (*Secale cereale*), Triticale (x *Triticosecale*), buckwheat (*Fagopyrum esculentum*).

For the purposes of the present invention it is to be understood that the term "cotton plant seed" refers to commercially used seeds of the family Malvaceae, typically *Gossypium* seeds which are collectively referred to herein as "cotton plant seeds" unless context demands otherwise. Cotton seeds suitable for coating with compositions of use in the invention include cotton seeds of the family Malvaceae and include representative *Gossypium* spp., such as *Gossypium hirsutum* (90% of world cotton production), *Gossypium barbadense* (8% of world cotton production), and *Gossypium arboreum* (2% of world cotton production).

For the purposes of the present invention it is to be understood that the term "legume plant seed" refers to seeds of leguminous plants. Legume plant seeds suitable for coating with compositions of use in the invention include seeds of legume species of the family Fabaceae that includes species such as Alfalfa (*Medicago sativa*), Austrian winter pea (*Pisum sativum*), Berseem clover (*Trifolium alexandrinum*), Black medic (*Medicago lupulina*), Chickling vetch/pea (*Lathyrus sativus*) Cowpea (*Vigna unguiculata*), Crimson clover (*Trifolium incarnatum*), Field peas (*Pisum sativum* subsp. *arvense*), Hairy vetch (*Vicia villosa*), Horse beans (*Vicia faba*), Kura clover (*Trifolium ambiguum*), Mung beans (*Vigna radiate*), Red clover (*Trifolium pratense*), Soya beans (*Glycine max*), Subterranean clover (*Trifolium subterraneum*), Sunn hemp (*Crotalaria juncea* L), White clover (*Trifolium repens*), White sweet clover (*Melilotus alba*), Woolypod vetch (*Vicia villosa* ssp. *dasycarpa*), Yellow sweet clover (*Melilotus officinalis*), Adzuki bean, (*Vigna angularis*, syn.: *Phaseolus angularis*), Broad bean (*V. faba* var. *major*), field bean (*Vicia faba*), Vetch (*Vicia sativa*), Common beans (*Phaseolus vulgaris*), including green beans, runner beans, haricot beans and the like, Chick pea (*Cicer arietinum*), Guar bean (*Cyamopsis tetragonoloba*), Hyacinth bean (*Dolichos lablab*), Lentil (*Lens culinaris*), Lima bean (*Phaseolus lunatus*), Lupin (*Lupinus* spp.), Mung bean (*Vigna radiata*, syn.:

*Phaseolus aureus*), Pea (*Pisum sativum*), Peanut (*Arachis hypogaea*), Pigeon pea (*Cajanus cajan*), Tepary bean (*Phaseolus acutifolius*) and the like.

For the purposes of the present invention it is to be understood that the term "maize seed" refers to any kind of maize seed from a *Zea mays* plant that is for food-related production or other industrial purpose such as starch production, bio-fuel manufacture, typically ethanol manufacture, animal fodder production and the like. Examples of *Zea mays* varieties used in industry include flour corn (*Zea mays* var. *Amylacea*); popcorn used as a food and in packaging materials (*Zea mays* var. *Evert*); flint corn used for hominy production (*Zea mays* var. *Indurata*); sweet corn used as a food (*Zea mays* var. *saccharata* and *Zea mays* var. *Rugosa*); Waxy corn used in producing food thickening agents, in the preparation of certain frozen foods, and in the adhesive industry (*Zea mays* var. *Ceratina*); Amylomaize maiz used in the production of bio-degradeable plastics (*Zea mays*); and striped maize used as an ornamental (*Zea mays* var. *Japonica*).

Maize is also known as "corn" and these two terms may be used interchangeably unless context demands otherwise.

For the purposes of the present invention it is to be understood that the term "field crop plant seed" refers to "oilseeds" and "vegetable seeds" which are collectively referred to herein as "field crop plant seeds" unless context demands otherwise.

Field crop plant seeds suitable for coating with compositions of use in the invention include oil seeds of the Crucifer family such as canola (*B. campestris*) and oilseed rape (*B. napus*); seeds of other Crucifer plant species including those of plants of the *B. oleraceae* such as seeds of types of cabbages, broccolis, cauliflowers, kales, Brussels sprouts, and kohlrabis; seeds of alliums including onion, leek and garlic. Other field crop plant seeds suitable for coating with compositions of use in methods of, and in uses of the invention include capsicums, tomatoes, cucurbits such as cucumbers, cantaloupes, summer squashes, pumpkins, butternut squashes, tropical pumpkins, calabazas, winter squashes, watermelons, lettuces, zucchinis (courgettes), aubergines, carrots, parsnips, swedes, turnips, sugar beet, celeriacs, Jerusalem artichokes, artichokes, bok choi, celery, Chinese cabbage, horse radish, musk melons, parsley, radish, spinach, beetroot for table consumption, linseed, sunflower, safflower, sesame, carob, coriander, mustard, grape, flax, dika, hemp, okra, poppy, castor, jojoba and the like.

Fodder crop plant seed of use in a method or use of the invention is seed that may be grown as a stock feed for further processing such as in bio-fuel production, processed animal feed production, field planting for farm animal consumption and the like.

For the purposes of the present invention it is to be understood that the term "fodder crop plant seed" refers to fodder crop plant seeds suitable for coating with compositions of use in the invention and includes species of the Poaceae, including *Lolium* spp such as Italian Ryegrass, Hybrid Ryegrass, and rye grasses such as perennial ryegrass (*Lolium perenne*); *Festuca* spp. such as red fescue, fescue, meadow fescue, Tall fescue, Lucerne Fescue, and the forage herbs such as chicory, Sheep's Burnett, Ribgrass (aka Robwort Plantain), Sainfoin, Yarrow, Sheep's Parsley and the like.

The flowability enhancing agent is made up of electret particles and is one that reduces the level of clumping in a seed population, such as a batch of seeds that is destined for sowing. Suitable flowability enhancement agents of use in the invention are waxes selected from natural, synthetic and mineral waxes. Typically, waxes of use as flowability enhancing agents in the invention have a melting temperature of $\geq 40°$ C., depending on design. Preferably, waxes of use in the invention include waxes having a melting point of preferably $\geq 50°$ C., and most preferably are made up of so-called hard waxes having a melting point of $\geq 70°$ C. Examples of natural waxes of use in the present invention include carnauba wax, beeswax, Chinese wax, shellac wax, spermaceti wax, myricyl palmitate, cetyl palmitate, candelilla wax, castor wax, ouricury wax, wool wax, sugar cane wax, retamo wax, rice bran wax and the like.

Synthetic waxes of use as flowability enhancing agents in the present invention include suitable waxes selected from paraffin wax, microcrystalline wax, Polyethylene waxes, Fischer-Tropsch waxes, substituted amide waxes, polymerized $\alpha$-olefins and the like.

Mineral waxes of use as flowability enhancing agents in the invention include montan wax (e.g. Luwax® Bayer) ceresin wax, ozocerite, peat wax and the like.

The flowability enhancing agent of use in the invention may comprise one or more waxes as herein defined. Preferably, the wax is selected from montan wax, paraffin wax and carnauba wax. Most preferably the wax of choice is carnauba wax. Where two or more waxes of use in the invention are employed as the flowability enhancing agent in a seed coating composition of use in the invention they may be heated together so as to form a liquid phase or a gaseous phase during which phases the waxes may be mixed, if required. Once the waxes are mixed they may be cooled to below the melting point of the wax possessing the lowest melting point in the liquid phase (where a gas phase is employed, this will be cooled to a liquid phase), forming a solid which may then be machined, such as by comminution, into particles of a pre-determined VMD as herein defined using conventional procedures. Once the wax is in the form of particles of a known VMD, the particles may be applied to plant seeds via conventional means.

The flowability enhancement agent of use in the invention is applied to plant seeds in dry particulate form. The flowability enhancing agent may be selected from organic materials selected from organic waxes having a melting point of $\geq 40$, $\geq 50°$ C., more preferably of $\geq 60°$ C., and most preferably are made up of hard waxes having a melting point of $\geq 70°$ C. Suitable waxes for use in the invention include mineral waxes, synthetic waxes and natural waxes as hereinbefore defined. Examples of waxes of use in the invention include carnauba wax, beeswax, Chinese wax, shellac wax, spermaceti wax, myricyl palmitate, cetyl palmitate, candelilla wax, castor wax, ouricury wax, wool wax, sugar cane wax, retamo wax, rice bran wax or a mixture of two or more thereof. Preferably, the flowability enhancement agent includes a substantial proportion of carnauba wax up to 100%, for example 1%, 5%, 10%, 20%, 30%, 40%, 50%, 60%, 70%, 80%, 90% or any proportion thereinbetween, the rest being made up of at least one other flowability enhancement agent as herein defined. Preferably, the selected flowability enhancement agent is a wax selected from mineral waxes and natural waxes or a mixture of two or more thereof such as carnauba wax, montan wax, paraffin wax or a mixture of two or more thereof. Preferably the flowability enhancement agent is one of or a mixture of carnauba wax and montan wax. Most preferably, the flowability enhancement agent is carnauba wax.

The skilled addressee will appreciate that the waxes of use in the invention may be applied simply as flowability enhancement agents per se, and in that form do not carry or contain an active agent such as a pesticide, a growth enhancing agent or other agents such as a fertiliser. Furthermore, the skilled addressee will appreciate that flowability enhancement agents of use in the invention may be added to seed coats (testa) of uncoated or non-pelleted seed typically in the form of dry particles. The skilled addressee will also appreciate that flowability enhancement agents of use in the invention may be added as an external layer on a conventional dry, pelleted seed or on a conventional dry, coated seed in the form of dry, free flowing particles. In any context of addition of flowability enhancement agents to coated, pelleted or uncoated plant seeds, the skilled addressee will appreciate that the flowability enhancing agent should be added to plant seeds in a dry particulate formulation or a powder formulation and not in a semi-liquid or a liquid form because it is envisaged that in either form, the flowability enhancing properties of such added agents are thought likely to be compromised. Naturally, the skilled addressee will appreciate that the viability of the plant seeds should not be significantly adversely affected by the addition of flowability enhancing agent.

The skilled addressee will also appreciate that where active agents may be added to flowability enhancing agents of use in the invention, effective amounts of active agent may be encapsulated or carried by the flowability enhancing agent but the level of such active agents should not significantly interfere with the ability of the flowability enhancing agent to adhere to plant seeds or of the ability of the flowability enhancing agent to control dust drift. Flowability enhancing agents of the invention may include active agents that may make up to 20% by mass of the particles, preferably up to about 10% by mass of the particles, and most preferably from about 5%-8% by mass of the particles. The choice of active agent that may be carried or encapsulated by a flowability enhancing particle of use in the invention is selected by design. Suitable active agents that may be carried by particles of use in the invention may be selected from pesticides, fertilizers, growth enhancing agents and the like.

In a further aspect of the invention there is provided use of a dry particulate free flowing formulation or composition in improving the flowability of seeds within a population of plant seeds, wherein the formulation or composition comprises at least a flowability enhancing agent that is made up of at least one species of electret particle selected from waxes, wherein the electret particles adhere more firmly to individual plant seeds than do particles that comprise a dry free flowing substance that is or includes a mineral earth component. The particles of wax of use in the invention comprise at least one species of wax selected from mineral waxes, natural waxes and synthetic waxes as defined herein above. The selected wax comprises at least one species of wax that has a melting temperature of ≥40° C., preferably a melting temperature of ≥50° C., and most preferably a melting temperature of ≥70° C. In a preferment, the wax comprises at least one species of wax selected from carnauba wax, montan wax, and paraffin wax or a mixture of two or more thereof.

In a further aspect of the invention there is provided use of a particulate, free flowing formulation or composition in controlling dust drift, preferably in reducing the level or amount of dust drift, from a population of plant seeds, wherein the particulate free flowing formulation or composition comprises at least a flowability enhancing agent made up of dry electret particles made of wax as herein defined that are able to adhere to individual plant seeds more firmly than a dry particulate compound or composition that is a free flowing flowability enhancing agent that comprises a substance that is a mineral earth or includes a mineral earth component.

The particles of wax of use in controlling dust drift are selected from at least one species of wax selected from mineral waxes, natural waxes and synthetic waxes as defined herein above. The selected wax comprises at least one species of wax that has a melting temperature of ≥40° C., preferably a melting temperature of ≥50° C., and most preferably a melting temperature of ≥70° C. In a preferment, the wax comprises at least one species of wax selected from carnauba wax, montan wax, and paraffin wax or a mixture of two or more thereof. Most preferably, the wax is carnauba wax.

The size of the particles used in controlling dust drift typically have a volume mean diameter of any conventional size, such as up to 200 μm, preferably from 10-100 μm, and most preferably from 10-50 μm depending on the type and size of plant seed that the particles are being applied to. Generally, the particles of use in the invention possess a volume mean diameter of ≥10 μm, such as in the range of from ≥10 μm to 200 μm, for example from ≥10 μm to 100 μm; or from ≥10 μm to 40 μm; or from ≥10 μm to 30 μm or any desired volume mean diameter value in between. Preferably, dry powder formulations or compositions of the invention comprise particles having a volume mean diameter of ≥10 μm, for example of 10 μm, 11 μm, 12 μm, 13 μm, 14 μm, 15 μm and the like up to any volume mean diameter of choice, such as up to 200 μm or any volume mean diameter in between for example 40 μm or 30 μm. In one preferment, compositions of the invention comprise electret particles having a volume mean diameter of from about 12 μm to 200 μm. One advantage of such formulations or compositions of the invention is that they are observed to limit dust drift from the seeds.

In a further aspect of the invention there is provided a method of controlling dust drift from a population of plant seeds by placing the plant seeds of a mass of seeds in contact with dry free flowing particles of a flowability enhancement agent made up of electret particles made of a wax that adheres more firmly to plant seeds than a dry particulate compound or composition that is a flowability enhancement agent that comprises a substance that is a mineral earth or includes a mineral earth component.

In this aspect of the invention, the wax comprises at least one species of wax selected from mineral waxes, natural waxes and synthetic waxes. Preferably, the at least one species of wax is a wax that has a melting temperature of ≥40-40° C. More preferably, the species of wax is at least one species of wax that has a melting temperature of ≥50-50° C. More preferably still, the at least one species of wax has a melting temperature of ≥70° C. Most preferably, the species of wax comprises at least one species of wax selected from carnauba wax, montan wax, and paraffin wax or a mixture of two or more thereof.

Again, the size of the particles used in the method of controlling dust drift typically have a volume mean diameter of any conventional size, such as up to 200 μm, preferably from 10-100 μm, and most preferably from 10-50 μm depending on the type and size of plant seed that the particles are being applied to. Generally, the particles of use in the invention possess a volume mean diameter of ≥10 μm, such as in the range of from ≥10 μm to 200 μm, for example from ≥10 μm to 100 μm; or from ≥10 μm to 40 μm; or from ≥10 μm to 30 μm or any desired volume mean diameter value in between. Preferably, dry powder formulations or compositions of the invention comprise particles having a volume mean diameter of ≥10 μm, for example of 10 μm, 11 μm, 12 μm, 13 μm, 14 μm, 15 μm and the like up to any volume mean diameter of choice, such as up to 200 μm or any volume mean diameter in between for example 40 μm or 30 μm. In one preferment, compositions of the invention comprise electret particles having a volume mean diameter of from about 12 μm to 200 μm. One advantage of such formulations or compositions of the invention is that they are observed to limit dust drift from the seeds.

There now follow examples and figures that illustrate the invention. It is to be understood that the examples are not to be construed as limiting the invention in any way.

EXAMPLES SECTION

1. Soya Bean

Objective: to assess the adhesion properties for carnauba wax (Entostat™) at a range of loadings using soya bean seed (*Glycine max*)

Study Outline

The purpose of the study was two-fold: firstly, to assess the ability of carnauba wax particles to adhere to seed in a situation designed to replicate a commercial seed sowing environment, and, secondly, to determine a relationship between seed type, loading and adhesion. It is intended that the resulting data is applicable to a number of individual elements of the seed treatment project. Information regarding optimum loading can be combined with enumeration studies using microbial control agents to indicate the potential for carnauba wax as a simple 'dust-on" application method for biofungicides. It will also provide insight as to the possibility of a role for carnauba wax in reformulation of existing chemical seed treatments, with special emphasis on the reduction of dust-drift. Recent studies [Krupke, C. H. et al. Multiple Routes of Pesticide Exposure for Honey Bees Living Near Agricultural Fields. *PLoS ONE* 7, e29268 (2012); Pistorius J. et al Bee Poisoning Incidents in Germany in Spring 2008 Caused by Abrasion of Active Substance from Treated Seeds During Sowing of Maize. *Julius-Kühn-Archly* 423, (2009)] have identified that the drift of material from treated seeds during sowing is responsible for large scale bee mortality.

The described method is intended to assess the amount of free floating dust and abrasion particles of treated seeds under defined mechanical stress conditions.

Treated seeds are mechanically stressed inside a rotating drum. A vacuum pump creates an air flow through the rotating drum, the connected glass cylinder and the attached filter unit. By the air flow, abraded dust particles are transported out of the rotating drum through the glass cylinder and subsequently through the filter unit. Coarse non-floating particles are separated and collected in the glass cylinder while floating dust particles are deposited onto a filter. The amount of floating dust collected on the filter is determined gravimetrically.

Test Item Details

Steps in Air Milling in Boyes Micronisation Process (for carnauba wax particles having a VMD of approx. 10 μm)

1. 2 kg carnauba wax blocks are first kibbled into approximately 4 to 6 mm pieces in a KT Handling Ltd Model 04 kibbler (serial no. 729/C) following the manufacturer's instructions.
2. The kibbled pieces are then passed through a Apex Construction Ltd Model 314.2 Comminuting Mill (serial no. A21306) and reduced further in size to a range of 250 to 300 um.
3. The comminuted particles are then passed through a Hosokawa Micron Ltd Alpine 100AFG jet mill (serial no. 168092) following the manufacturer's instructions, setting the mill at a speed of 12500 rpm, with a positive system pressure of 0.03 bar.
4. The grinding air is to be kept to 6 bar, the system rinsing air flow and Classifying Wheel gap rinsing air are both to be set at a minimum of 0.5 bar and no more than 0.75 bar, the cleaning air filter is to register a delta of no more than 5 bar to achieve a final particle size with a VMD of 9.58 um.

Carnauba wax was combined with soya bean seed at three loadings (see below).

Soya bean seed (Pripyat), supplied by Soya UK (West End, Hampshire).

REFERENCE ITEM DETAILS

Soya bean pre-treated with Thiraflo (Chemtura, Laurenceville, USA)
Talc-Simple Talc, Unscented, Johnsons
Treatments
1. Soybean treated with 0.01% carnauba wax (by mass)
2. Soybean treated with 0.1% carnauba wax (by mass)
3. Soybean treated with 1% carnauba (by mass)
4. Soybean treated with 1% Talc (by mass)
5. Soybean, untreated All treatments were replicated three times Test System Apparatus: An analytical balance (accuracy 0.1 mg). As the last digit of a scale carries a larger error it is recommended to use a 5-decimal scale to achieve an accurate reading of the 4th decimal.

Heubach Dustmeter device (Heubach GmbH, Heubachstrasse 7, 38685 Langelsheim, Germany)
Metal rotating drum
Glass cylinder
Non-electrostatic filter housing with conditioned glassfibre filter disc (Whatman GF 92 or Macherey Nagel Type MN 85/70 BF, or equivalent specification)
Drive & control unit with touchscreen control panel
Constant climate chamber (e.g. Binder, KBF 720)
Paper bags (not airtight)
Air ionizer (e.g. Sartorius, STAT-FAN YIB-01, or PRX U field ionizer from Haug GmbH, Germany, or equivalent)
Seed Counter (e.g. Pfeuffer, Contador or GTA Sensorik, Marvin, or equivalent)
Sample A sample must consist of at least 500 g+/−5% of seeds. The thousand grain weight (TGW) of the seeds is listed below:

| Seed Type | Thousand Grain Weight g (TGW) |
|---|---|
| Soya bean | 161 |

Samples were prepared in block bottom bags (1.4 kg) 150×32×310 mm. 250 g of seed were added, followed by the appropriate quantity of the required treatment, before the final 250 g of seed were added. The bags were then agitated for 20 seconds to ensure an even distribution of treatment throughout the seed sample. The bags were then labelled and sealed and sent to the test site at INCOTEC Analytical Lab Europe BV, Graanmarkt 3a, 1681 PA Zwaagdijk-Oost, The Netherlands.

Sample Schedule

| sample number | Crop | Treatment | % age | by mass (g) | Replicate |
|---|---|---|---|---|---|
| 1 | Soybean | untreated control | n/a | n/a | 1 |
| 2 | Soybean | untreated control | n/a | n/a | 2 |
| 3 | Soybean | untreated control | n/a | n/a | 3 |
| 4 | Soybean | Entostat ™ | 0.01 | 0.05 | 1 |
| 5 | Soybean | Entostat ™ | 0.01 | 0.05 | 2 |
| 6 | Soybean | Entostat ™ | 0.01 | 0.05 | 3 |

-continued

| sample number | Crop | Treatment | % age | by mass (g) | Replicate |
|---|---|---|---|---|---|
| 7 | Soybean | Entostat ™ | 0.1 | 0.5 | 1 |
| 8 | Soybean | Entostat ™ | 0.1 | 0.5 | 2 |
| 9 | Soybean | Entostat ™ | 0.1 | 0.5 | 3 |
| 10 | Soybean | Entostat ™ | 1.0 | 5 | 1 |
| 11 | Soybean | Entostat ™ | 1.0 | 5 | 2 |
| 12 | Soybean | Entostat ™ | 1.0 | 5 | 3 |
| 13 | Soybean | Commercial | n/a | n/a | 1 |
| 14 | Soybean | Commercial | n/a | n/a | 2 |
| 15 | Soybean | Commercial | n/a | n/a | 3 |
| 16 | Soybean | Talc | 1.0 | 5 | 1 |
| 17 | Soybean | Talc | 1.0 | 5 | 2 |
| 18 | Soybean | Talc | 1.0 | 5 | 3 |

Commercial Seed Treatments Used:
Soybean Thiraflo
Procedure: use guidelines defined by European Seed Association STAT Dust Working Group, (Version 1.0, 23 Mar. 2011).

Laboratory Conditions

The test has to be performed in a laboratory (separated from the treating area) at 20° C. to 25° C. and 30% to 70% relative humidity which is free of free floating dust particles. Any other testing which could interfere with the analytical scales (electrostatics, vibrations etc.) should be avoided.

Calibration

No calibration is necessary before measurement. It is recommended that the air flow rate, time of measurements and rotational settings are checked on a routine basis (every 2-3 years) by the technical service of the manufacturer or an equivalent qualified technical service.

Apparatus Preparation

During initial installation of the Heubach equipment make sure that the same is horizontally leveled.

After disconnecting the vacuum tube from the filter unit, the Heubach device is stepwise disassembled: the filter unit is removed and opened, the glass cylinder removed and finally the metal drum removed and opened.

Make sure that all components which are in contact with seed or dust (i.e. rotating drum, glass cylinder, and filter unit including rubber O-ring) have been thoroughly cleaned. Cleaning is routinely done using a vacuum cleaner with a pointed nozzle.

Note: If the drum is either used for the first time in this test or has been cleaned with alcohol there is a need to run 2 cycles with treated seeds before starting the actual measurements on your samples. This ensures a constant occupancy of the pores in the metal surface.

Switch on the main power of the Heubach device min. 30 minutes before starting any measurement in order to allow proper warm-up of the flow meter. For setting the parameters on the control panel choose the program "User Method" in which the parameters are manually set to the values below. It is recommended to set the parameters after full assembly of the device.

Parameter Settings
Rotation speed=30 [rpm]
Rotation time=120 s
Airflow rate=20 [liters per minute]

Sample Preparation

Prior to testing, seed samples are stored in a constant climate chamber for at least 48 hours (2 days) at 20° C.±2° C. and at 50%±10% relative humidity. To allow equilibration, seeds must be kept in paper bags (not airtight) when entering the climate chamber.

For obtaining a working sample a gentle method should be used to reduce the submitted sample in size to the size needed for the test. This to avoid damage to the treated seed which could lead to artificially enhanced dust levels. Examples of gentle methods are the modified halving method, the spoon method and the hand halving method described in the ISTA Rules.

Measurement

Carefully transfer (avoid dust) 100±1 grams of the conditioned seeds (weight seeds $w_S$ [g]; accuracy: 0.01 gram) into the metal drum of the Heubach device, then correctly close and reassemble the drum and connect the glass cylinder. The system has to be leveled perfectly horizontally and no obstruction of the rotating parts and of the internal or external airflow must take place.

The time for transferring and analysing the sample is to be kept as short as possible in order to avoid a change in its relative humidity. A contamination with non-seed dust particles must be excluded.

Place a glassfibre filter disc (Whatman GF 92 or similar specification) in the filter unit according to the description in the manual. For equilibration with the laboratory conditions, the filter discs will be stored in an open box next to the Heubach device. In order to prevent effects resulting from electrostatic charging, the use of a non-electrostatic filter-housing offered by HEUBACH is compulsory to use. The filter unit including the filter disc is weighed (weight filter assembly $w0$ [g]; accuracy: 0.1 mg), placed on the glass cylinder and connected to the vacuum tube.

On the control panel pre-select the "time" option. Start the rotation cycle by pressing "I" on the control panel. After completion of the run, the rotation must have fully stopped before any parts of the apparatus may be disassembled. Remove the filter unit including the filter disc carefully from the glass cylinder and weigh it in the same manner as described before (weight filter assembly $w1$ [g]; accuracy: 0.1 mg).

If significant amounts of dust have passed through the filter disc (by visible inspection), the test must be stopped immediately and the filter unit checked for incorrect assembly or damages. If necessary, it has to be replaced and the test has to be repeated.

The test has to be performed twice. After each measurement, the apparatus must be cleaned.

If the rotation speed (rpm) displayed on the control panel during the measurement deviates more than ±10% from the pre-set value or if the total air volume sampled during the measurement deviates more than ±10% from the expected volume of 40 L (20 L/min for 2 min) the measurement has to be redone.

As a back-up control for the air volume a separate flow-meter [e.g. DFM Typ SVB (Uniflux ¼") from VAF-Fluid-Technik GmbH, Germany; www.vaf-fluidtechnik.de] can be inserted in the plastic air hose.

Evaluation and Calculation of Results

The Heubach dust value is expressed in g/100 kg of treated seeds. Depending on requirements and seed type tested, the result can be also expressed in g/100,000 kernels, taking into account the Thousand Seed Weight (TSW) of the tested sample.

Use the following formula to convert the measured result to the Heubach dust value:

$$\text{Heubach dust value} = \frac{(W_1 - W_0) \times 100{,}000}{W_S} \text{ [g/100 kg]}$$

or alternatively expressed in g/100,000 kernels:

$$(W_1 - W_0) \times 100 \times TGW$$

Heubach dust value=- - -[g/100,000 kernels]$W_S$
wherein:
$W_1$=weight of the loaded filter unit incl. filter disc [g]
$W_0$=weight of the empty filter unit incl. filter disc [g]
$W_S$=weight of the treated seeds [g]
100,000=conversion factor a [ ]
100=conversion factor b [ ]
TGW=Thousand Grain Weight [g/1000 kernels]

The final result is the mean of the two measurements. If a threshold value is defined the test must be repeated if one test result is higher than 50% of the threshold value and if the two test results differ more than 20% from each other. In case of experimental or voluntarily purposes without a mandated threshold value (e.g. small seeded crops) the test must be repeated if the two test results differ more than 20% and at least one test result exceeds 1 g/100 kg. If both test results are below 1 g/100 kg and the two results differ more than 0.2 g the test must be repeated.

Simultaneous Tests for General Linear Hypotheses

| Source | DF | SS | MS | F | P |
|---|---|---|---|---|---|
| Treatment | 5 | 6018.0 | 1203.6 | 21.78 | >0.0001 |
| Error | 12 | 663.2 | 55.3 | | |
| Total | 17 | 6681.2 | | | |

Multiple Comparisons of Means: Tukey Contrasts
Grouping Information Using Tukey Method

| Treatment | N | Mean | Grouping |
|---|---|---|---|
| Soya beanTalc1 | 3 | 50.370 | A |
| Soya bean Ento1 | 3 | 5.495 | B |
| Soya beancontrol | 3 | 0.668 | B |
| Soya bean Ent0.1 | 3 | 0.590 | B |
| Soya bean Ent0.01 | 3 | 0.536 | B |
| Soya beanComm | 3 | 0.442 | B |

Means that do not share a letter are significantly different.
Fit: aov(formula=MeanDust~Crop, data=Soybean)
Linear Hypotheses:

| | Estimate | Std. Error | t value | Pr (>|t|) |
|---|---|---|---|---|
| Soyacontrol-SoyaComm | 0.22633 | 6.06997 | 0.037 | 1.000 |
| SoyaEnt0.01-SoyaComm | 0.09433 | 6.06997 | 0.016 | 1.000 |
| SoyaEnt0.1-SoyaComm | 0.14800 | 6.06997 | 0.024 | 1.000 |
| SoyaEnto1-SoyaComm | 5.05333 | 6.06997 | 0.833 | 0.955 |
| SoyaTalc1-SoyaComm | 49.92833 | 6.06997 | 8.225 | <1e-04 *** |
| SoyaEnt0.01-Soyac'trl | 0.13200 | 6.06997 | −0.022 | 1.000 |
| SoyaEnt0.1-Soyac'trl | 0.07833 | 6.06997 | −0.013 | 1.000 |
| SoyaEnt1-Soyac'trl | 4.82700 | 6.06997 | 0.795 | 0.963 |
| SoyaTalc1-Soyac'trl | 49.70200 | 6.06997 | 8.188 | <1e-04 *** |
| SoyaEnt0.1-SoyaEnt0.01 | 0.05367 | 6.06997 | 0.009 | 1.000 |
| SoyaEnto1-SoyaEnt0.01 | 4.95900 | 6.06997 | 0.817 | 0.959 |
| SoyaTalc1-SoyaEnt0.01 | 49.83400 | 6.06997 | 8.210 | <1e-04 *** |
| SoyaEnt1-SoyaEnt0.1 | 4.90533 | 6.06997 | 0.808 | 0.960 |
| SoyaTalc1-SoyaEnt0.1 | 49.78033 | 6.06997 | 8.201 | <1e-04 *** |
| SoyaTalc1-SoyaEnto1 | 44.87500 | 6.06997 | 7.393 | <1e-04 *** |

Signif. codes: 0 '***'

Figure 1:
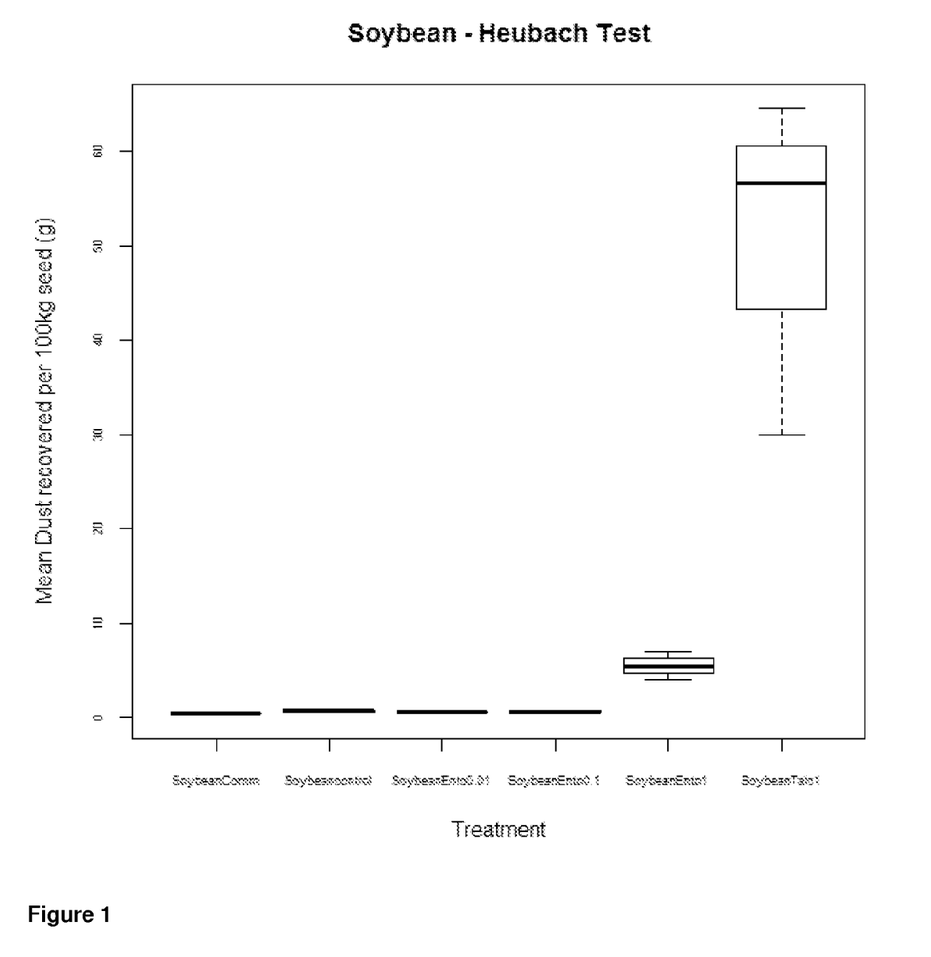
FIG. 1: (Soya bean) Boxplot of Heubach Test Results

Results are shown in FIG. 1

Method for Assessing Flowability/Plantability

Seed treatments are assessed to measure their impact on the plantability and flowability of the treated seed. "Plantability" relates to a measurement of sowing inaccuracies, such as, seed dropping failures and double seed drops occurring within a predetermined distance or area. "Flowability" refers to the treated seeds ability to flow or move through a typical planting process using conventional sowing equipment. Clogging and clumping of seeds that may occur through the sowing process is a factor that affects the efficiency of flowability of seed. If clumping and clogging occurs it can lead to an uneven stand of crops. Internal friction angles and the flowability index (the ratio of the highest consolidation stress and unconfined yield strength) of the material are measured.

The coefficient of uniformity for the Entostat treated seed is compared to that of untreated and commercially treated seed (polymer-coated and talc).

SGS Crop and Seed Services (Geneva, Switzerland) provide a testing service for the determination of flowability/plantability of seed to the public in accordance with standardised protocols that are widely acceptable to the seed industry.

Results

Differences in flowability/plantability from the treated soya bean seed are observed relative to controls.

2. Perennial Rye Grass

Objective: to assess the adhesion properties for carnauba wax (Entostat™) at a range of loadings using seeds of perennial rye grass (*Lolium perenne*).

Study Outline

Same as for example 1 (soya bean).

Test Item Details

Steps in air milling are the same as for soya bean (above) with the exception that carnauba wax was combined with perennial rye grass seed at three loadings (see below).

Perennial rye grass seed was supplied by Herbiseeds Ltd. (Twyford, UK)

REFERENCE ITEM DETAILS

Perennial rye grass seed pre-treated with Advance, thiazole (Chemtura Agrosolutions)

Talc-Simple Talc, unscented, Johnsons

Treatments

1. Rye grass seed treated with 0.01% carnauba wax (by mass)
2. Rye grass seed treated with 0.1% carnauba wax (by mass)
3. Rye grass seed treated with 1% carnauba wax (by mass)
4. Rye grass seed treated with 1% Talc (by mass)
5. Rye grass seed, untreated All treatments were replicated three times Test System Apparatus: same as for soya bean example 1.

Sample

A sample must consist of at least 500 g+/−5% of seeds. The thousand grain weight (TGW) of the seeds is listed below:

| Seed Type | Thousand Grain Weight g (TGW) |
|---|---|
| Rye grass seed | 1.5 |

Samples are prepared in block bottom bags (1.4 kg) 150× 32×310 mm. 250 g of seed is added, followed by the appropriate quantity of the required treatment, before the final 250 g of seed is added. The bags are then agitated for 20 seconds to ensure an even distribution of treatment throughout the seed sample. The bags are then labelled and sealed and are sent to the test site.

Sample Schedule

| Sample No. | Crop | Treatment | % | by mass | Replicate |
|---|---|---|---|---|---|
| 1 | Rye | untreated control | n/a | n/a | 1 |
| 2 | Rye | untreated control | n/a | n/a | 2 |
| 3 | Rye | untreated control | n/a | n/a | 3 |
| 4 | Rye | Entostat ™ | 0.01 | 0.05 | 1 |
| 5 | Rye | Entostat ™ | 0.01 | 0.05 | 2 |
| 6 | Rye | Entostat ™ | 0.01 | 0.05 | 3 |
| 7 | Rye | Entostat ™ | 0.1 | 0.5 | 1 |
| 8 | Rye | Entostat ™ | 0.1 | 0.5 | 2 |
| 9 | Rye | Entostat ™ | 0.1 | 0.5 | 3 |
| 10 | Rye | Entostat ™ | 1.0 | 5 | 1 |
| 11 | Rye | Entostat ™ | 1.0 | 5 | 2 |
| 12 | Rye | Entostat ™ | 1.0 | 5 | 3 |
| 13 | Rye | Commercial | n/a | n/a | 1 |
| 14 | Rye | Commercial | n/a | n/a | 2 |
| 15 | Rye | Commercial | n/a | n/a | 3 |
| 16 | Rye | Talc | 1.0 | 5 | 1 |
| 17 | Rye | Talc | 1.0 | 5 | 2 |
| 18 | Rye | Talc | 1.0 | 5 | 3 |

Commercial Seed Treatments
  Rye grass Advance, thiazole
  PROCEDURE: see guidelines defined by European Seed Association STAT Dust Working Group, (Version 1.0, 23 Mar. 2011)
Laboratory Conditions
  The test is performed in a laboratory (separated from the treating area) at 20° C. to 25° C. and 30% to 70% relative humidity, free of free floating dust particles.
Calibration
  No calibration is necessary before measurement. It is recommended that the air flow rate, time of measurements and rotational settings are checked on a routine basis (every 2-3 years) by the technical service of the manufacturer or an equivalent qualified technical service.
Apparatus Preparation
  Same as for example 1 (soya bean).
Parameter Settings
  Same as for example 1 (soya bean).
Sample Preparation
  Same as for example 1.
Measurement
  Same as for example 1.
Evaluation and Calculation of Results
  Same as for example 1.
Method for Assessing Flowability/Plantability
  Same as for example 1.
Results
  Differences in flowability/plantability from the treated rye grass seed are observed relative to controls.
3. Cotton
  Objective: to assess the adhesion properties for Entostat™ at a range of loadings using seed types: cotton (*Gossypium hirsutum*).
Study Outline
  Same as for example 1.
Test Item Details
  Steps in air milling are the same as for soya bean (above) with the exception that carnauba wax (Entostat™) was combined with cotton seed at three loadings (see below).
  Cotton seed (MRC 270, non-GMO) was supplied by MRC Seeds (Houston, Tex., USA).

REFERENCE ITEM DETAILS

Cotton seed pre-treated with Headline—F500 (BASF Agro, Germany), supplied by MRC seeds, Houston, Tex., USA
  Talc-simple talc, unscented, Johnsons
Treatments
  1. Cotton seed treated with 0.01% carnauba wax (by mass)
  2. Cotton seed treated with 0.1% carnauba wax (by mass)
  3. Cotton Seed treated with 1% carnauba wax (by mass)
  4. Cotton Seed treated with 1% Talc (by mass)
  5. Cotton Seed, untreated
  All treatments were replicated three times
Test System
  Apparatus: same as for example 1.
Sample
  A sample must consist of at least 500 g+/−5% of seeds. The thousand grain weight (TGW) of the seeds is listed below:
  Seed Type Thousand Grain Weight g (TGW)
  Cotton 125
  Samples are prepared as in example 1.
Sample Schedule

| sample number | Crop | Treatment | % age | by mass | Replicate |
|---|---|---|---|---|---|
| 1 | Cotton | untreated control | n/a | n/a | 1 |
| 2 | Cotton | untreated control | n/a | n/a | 2 |
| 3 | Cotton | untreated control | n/a | n/a | 3 |
| 4 | Cotton | Entostat ™ | 0.01 | 0.05 | 1 |
| 5 | Cotton | Entostat ™ | 0.01 | 0.05 | 2 |
| 6 | Cotton | Entostat ™ | 0.01 | 0.05 | 3 |
| 7 | Cotton | Entostat ™ | 0.1 | 0.5 | 1 |
| 8 | Cotton | Entostat ™ | 0.1 | 0.5 | 2 |
| 9 | Cotton | Entostat ™ | 0.1 | 0.5 | 3 |
| 10 | Cotton | Entostat ™ | 1.0 | 5 | 1 |
| 11 | Cotton | Entostat ™ | 1.0 | 5 | 2 |
| 12 | Cotton | Entostat ™ | 1.0 | 5 | 3 |
| 13 | Cotton | Commercial | n/a | n/a | 1 |
| 14 | Cotton | Commercial | n/a | n/a | 2 |
| 15 | Cotton | Commercial | n/a | n/a | 3 |
| 16 | Cotton | Talc | 1.0 | 5 | 1 |
| 17 | Cotton | Talc | 1.0 | 5 | 2 |
| 18 | Cotton | Talc | 1.0 | 5 | 3 |

Commercial Seed Treatments
  Cotton Headline—F500
  Procedure: see guidelines defined by European Seed Association STAT Dust Working Group, (Version 1.0, 23 Mar. 2011)
Laboratory Conditions
  The test is performed in a laboratory (separated from the treating area) at 20° C. to 25° C. and 30% to 70% relative humidity which is free of free floating dust particles.
Calibration
  Same as for example 1.
Apparatus Preparation
  Same as for example 1.
Parameter Settings
  Same as for example 1.
Sample Preparation
  Same as for example 1.
Measurement
  Same as for example 1.
Evaluation and Calculation of Results
  Same as for example 1.
Method for Assessing Flowability/Plantability
  Same as for example 1.

Results
Differences in flowability/plantability from treated cotton seed are observed relative to controls.

4. Maize

Objective: to assess the adhesion properties of Entostat® (Exosect Limited) at a range of loadings using maize (*Zea mays*) seed.

Study Outline

The same as that for example 1.

Test Item Details

Steps in Air Milling are the same as for example 1 except that Entostat™ was combined with maize seed at three loadings (see below).

Maize seed (DUO maize) was supplied by Bright Seeds Ltd. (Burcombe, Wiltshire)

REFERENCE ITEM DETAILS

Maize seed pre-treated with Poncho, (Bayer CropScience AG, Monheim am Rhein, Germany)

Talc-Simple Talc, Unscented, Johnsons

Treatments
1. Maize treated with 0.01% Entostat™ (by mass)
2. Maize treated with 0.1% Entostat™ (by mass)
3. Maize treated with 1% Entostat™ (by mass)
4. Maize treated with 1% Talc (by mass)
5. Maize, untreated All treatments were replicated three times Test System Apparatus: same as that used in example 1.

Sample

A sample must consist of at least 500 g+/−5% of seeds. The thousand grain weight (TGW) of the seeds is listed below:

Seed Type Thousand Grain Weight g (TGW)

Maize 380

Samples were prepared in block bottom bags as in example 1, and sent off to The Netherlands for testing.

Sample Schedule

| sample number | Crop | Treatment | % age | by mass | Replicate |
|---|---|---|---|---|---|
| 1 | Maize | untreated control | n/a | n/a | 1 |
| 2 | Maize | untreated control | n/a | n/a | 2 |
| 3 | Maize | untreated control | n/a | n/a | 3 |
| 4 | Maize | Entostat ™ | 0.01 | 0.05 | 1 |
| 5 | Maize | Entostat ™ | 0.01 | 0.05 | 2 |
| 6 | Maize | Entostat ™ | 0.01 | 0.05 | 3 |
| 7 | Maize | Entostat ™ | 0.1 | 0.5 | 1 |
| 8 | Maize | Entostat ™ | 0.1 | 0.5 | 2 |
| 9 | Maize | Entostat ™ | 0.1 | 0.5 | 3 |
| 10 | Maize | Entostat ™ | 1.0 | 5 | 1 |
| 11 | Maize | Entostat ™ | 1.0 | 5 | 2 |
| 12 | Maize | Entostat ™ | 1.0 | 5 | 3 |
| 13 | Maize | Commercial | n/a | n/a | 1 |
| 14 | Maize | Commercial | n/a | n/a | 2 |
| 15 | Maize | Commercial | n/a | n/a | 3 |
| 16 | Maize | Talc | 1.0 | 5 | 1 |
| 17 | Maize | Talc | 1.0 | 5 | 2 |
| 18 | Maize | Talc | 1.0 | 5 | 3 |

Commercial Seed Treatments Used

Maize Poncho

Procedure: use guidelines defined by European Seed Association STAT Dust Working Group (Version 1.0, 23 Mar. 2011).

Laboratory Conditions

Same as for example 1.

Calibration

Same as for example 1.

Apparatus Preparation

Same as for example 1.

Parameter Settings

Same as for example 1.

Sample Preparation

Same as for example 1.

Measurement

Same as for example 1.

Evaluation and Calculation of Results

Same as for example 1.

Figure 2:
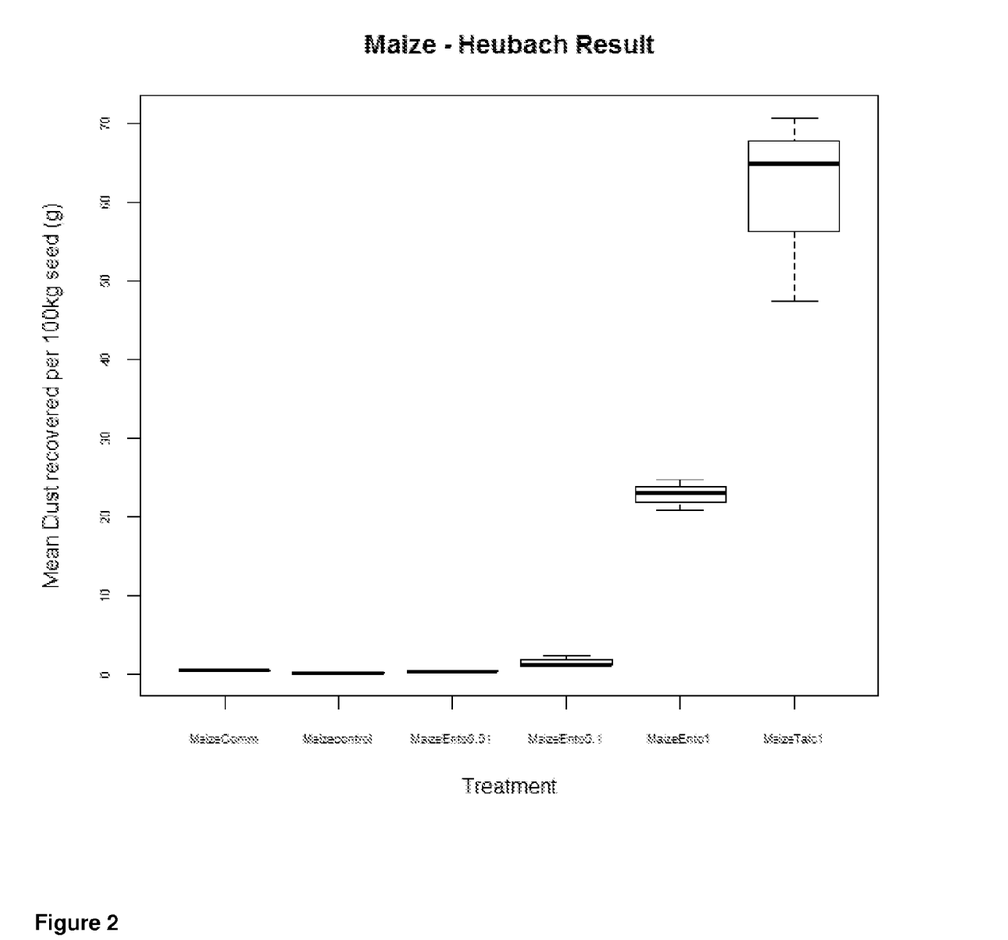
FIG. 2: (maize) Boxplot of Heubach Test results

Results are shown in FIG. 2

Simultaneous Tests for General Linear Hypotheses

| Source | DF | SS | MS | F | P |
|---|---|---|---|---|---|
| Crop | 5 | 9001.2 | 1800.2 | 71.73 | >0.0001 |
| Error | 12 | 301.2 | 25.1 | | |
| Total | 17 | 9302.4 | | | |

Multiple Comparisons of Means: Tukey Contrasts

Grouping Information Using Tukey Method

| Crop | N | Mean | Grouping |
|---|---|---|---|
| MaizeTalc1 | 3 | 61.014 | A |
| MaizeEnt1 | 3 | 22.872 | B |
| MaizeEnt0.1 | 3 | 1.620 | C |
| MaizeComm | 3 | 0.537 | C |
| MaizeEnt0.01 | 3 | 0.386 | C |
| Maizecontrol | 3 | 0.121 | C |

Means that do not share a letter are significantly different.

Linear Hypotheses:

| | Estimate | Std. Error | t value | Pr(>|t|) |
|---|---|---|---|---|
| Maizecont − MaizeComm | 0.416 | 4.090 | 0.102 | 1.000 |
| MaizeEnt0.01 − MaizeComm | 0.151 | 4.090 | 0.037 | 1.000 |
| MaizeEnt0.1 − MaizeComm | 1.083 | 4.090 | 0.265 | 0.999 |
| MaizeEnt1 − MaizeComm | 22.335 | 4.090 | 5.460 | 0.001** |
| MaizeTalc1 − MaizeComm | 60.476 | 4.090 | 14.785 | <0.001*** |
| MaizeEnt0.01 − Maizecont | 0.265 | 4.090 | 0.065 | 1.000 |
| MaizeEnt0.1 − Maizecont | 1.499 | 4.090 | 0.367 | 0.998 |
| MaizeEnt1 − Maizecont | 22.751 | 4.090 | 5.562 | 0.001** |
| MaizeTalc1 − Maizecont | 60.893 | 4.090 | 14.887 | <0.001*** |
| MaizeEnt0.1 − MaizeEnt0.01 | 1.234 | 4.090 | 0.302 | 0.999 |
| MaizeEnt1 − MaizeEnt0.01 | 22.486 | 4.090 | 5.497 | 0.001** |
| MaizeTalc1 − MaizeEnt0.01 | 60.628 | 4.090 | 14.822 | <0.001*** |
| MaizeEnt1 − MaizeEnt0.1 | 21.252 | 4.090 | 5.196 | 0.002** |
| MaizeTalc1 − MaizeEnt0.1 | 59.393 | 4.090 | 14.520 | <0.001*** |
| MaizeTalc1 − MaizeEnt1 | 38.141 | 4.090 | 9.325 | <0.001*** |

Statistical significance codes: 0* 0.001

Method for Assessing Flowability/Plantability

Same as that used in example 1.

Results

Differences in flowability/plantability from the treated maize seed are observed relative to controls.

5. Wheat

Objective: to assess the adhesion properties for carnauba wax (Entostat™, Exosect Ltd) at a range of loadings using wheat seed (*Triticum aestivum*).

Study Outline

The same as that described in example 1.

Test Item Details

Steps in Air Milling are the same as those used in example 1 except that Entostat™ was combined with wheat seed at three loadings (see below). Wheat seed was supplied by a local farmer.

REFERENCE ITEM DETAILS

Wheat pre-treated with Kinto (BASF SE, Limburgerhof, Germany)
Talc-simple Talc, Unscented, Johnsons
Treatments
1. Wheat treated with 0.01% Entostat™ (by mass)
2. Wheat treated with 0.1% Entostat™ (by mass)
3. Wheat treated with 1% Entostat™ (by mass)
4. Wheat treated with 1% Talc (by mass)
5. Wheat, untreated
   All treatments were replicated three times
Test System
   Apparatus: same as that used in example 1.
Sample
   A sample must consist of at least 500 g+/−5% of seeds. The thousand grain weight (TGW) of the seeds is listed below:

| Seed Type | Thousand Grain Weight g (TGW) |
|---|---|
| Wheat | 50 |

Samples were prepared as in example 1 and sent for testing in The Netherlands (see example 1).
Sample Schedule

| sample number | Crop | Treatment | % age | by mass | Replicate |
|---|---|---|---|---|---|
| 1 | Wheat | untreated control | n/a | n/a | 1 |
| 2 | Wheat | untreated control | n/a | n/a | 2 |
| 3 | Wheat | untreated control | n/a | n/a | 3 |
| 4 | Wheat | Entostat ™ | 0.01 | 0.05 | 1 |
| 5 | Wheat | Entostat ™ | 0.01 | 0.05 | 2 |
| 6 | Wheat | Entostat ™ | 0.01 | 0.05 | 3 |
| 7 | Wheat | Entostat ™ | 0.1 | 0.5 | 1 |
| 8 | Wheat | Entostat ™ | 0.1 | 0.5 | 2 |
| 9 | Wheat | Entostat ™ | 0.1 | 0.5 | 3 |
| 10 | Wheat | Entostat ™ | 1.0 | 5 | 1 |
| 11 | Wheat | Entostat ™ | 1.0 | 5 | 2 |
| 12 | Wheat | Entostat ™ | 1.0 | 5 | 3 |
| 13 | Wheat | Commercial | n/a | n/a | 1 |
| 14 | Wheat | Commercial | n/a | n/a | 2 |
| 15 | Wheat | Commercial | n/a | n/a | 3 |
| 16 | Wheat | Talc | 1.0 | 5 | 1 |
| 17 | Wheat | Talc | 1.0 | 5 | 2 |
| 18 | Wheat | Talc | 1.0 | 5 | 3 |

Figure 3:
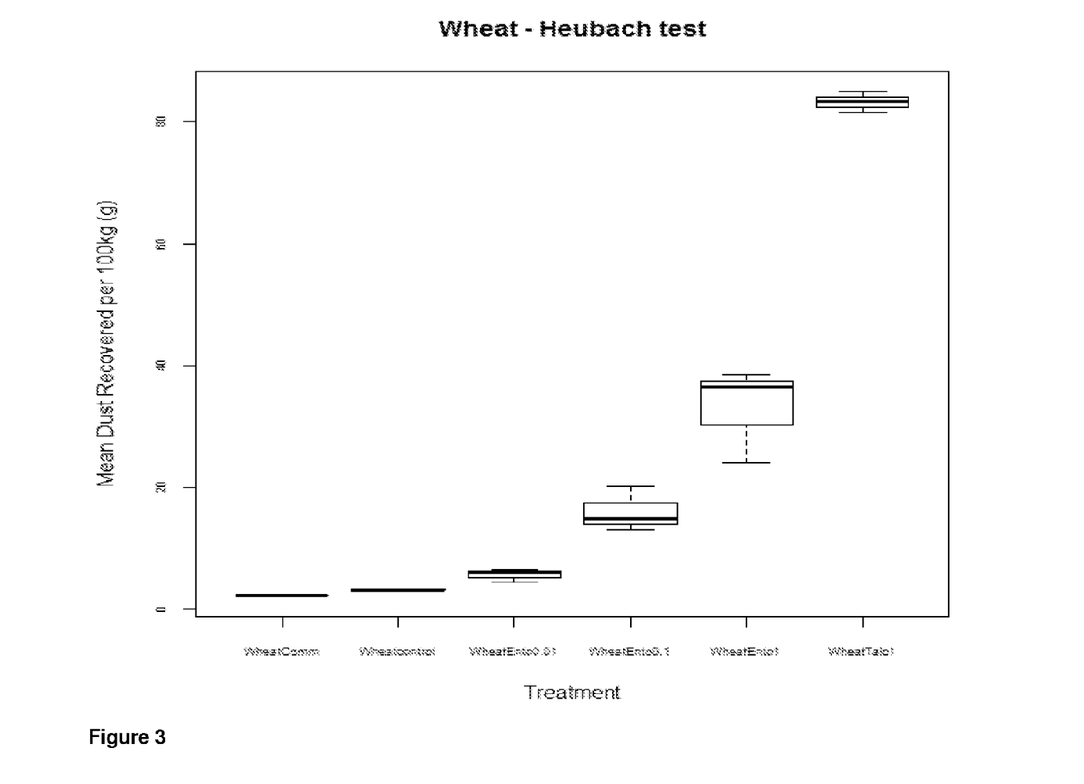
FIG. 3: (wheat) Boxplot of Heubach Test Results (n=3)

Commercial Seed Treatments Used
   Wheat Kinto
   Procedure: see guidelines defined by European Seed Association STAT Dust Working Group, (Version 1.0, 23 Mar. 2011)
Laboratory Conditions
   The test is performed in a laboratory (separated from the treating area) at 20° C. to 25° C. and 30% to 70% relative humidity which is free of free floating dust particles. Any other testing which could interfere with the analytical scales (electrostatics, vibrations etc.) should be avoided.
Calibration
   Same as for example 1.
Apparatus Preparation
   Same as for example 1.
Parameter Settings
   Same as for example 1.
Sample Preparation
   Same as for example 1.
Measurement
   Same as for example 1.
Evaluation and Calculation of Results
   Same as for example 1.
   Results are shown in FIG. 3.
Simultaneous Tests for General Linear Hypotheses

| Source | DF | SS | MS | F | P |
|---|---|---|---|---|---|
| Treatment | 5 | 14705.2 | 2941.0 | 223.74 | >0.0001 |
| Error | 12 | 157.7 | 13.1 | | |
| Total | 17 | 14862.9 | | | |

Multiple Comparisons of Means: Tukey Contrasts
Grouping Information Using Tukey Method

| Treatment | N | Mean | Grouping |
|---|---|---|---|
| WheatTalc1 | 3 | 83.299 | A |
| WheatEnt1 | 3 | 33.020 | B |
| WheatEnt0.1 | 3 | 16.002 | C |
| WheatEnt0.01 | 3 | 5.651 | D |
| Wheatcontrol | 3 | 3.229 | D |
| WheatComm | 3 | 2.276 | D |

Means that do not share a letter are significantly different.
Linear Hypotheses:

| | Estimate | Std. Error | t value | Pr(>|t|) |
|---|---|---|---|---|
| Wheatcontrol − WheatComm | 0.953 | 2.960 | 0.322 | 0.999 |
| WheatEnt0.01 − WheatComm | 3.375 | 2.960 | 1.140 | 0.855 |
| WheatEnt0.1 − WheatComm | 13.726 | 2.960 | 4.637 | 0.005 ** |
| WheatEnt1 − WheatComm | 30.744 | 2.960 | 10.385 | <0.001*** |
| WheatTalc1 − WheatComm | 81.023 | 2.960 | 27.370 | <0.001*** |
| WheatEnt0.01 − Wheatcont | 2.422 | 2.960 | 0.818 | 0.958 |
| WheatEnt0.1 − Wheatcont | 12.773 | 2.960 | 4.315 | 0.009 ** |
| WheatEnt1 − Wheatcont | 29.791 | 2.960 | 10.063 | <0.001*** |
| WheatTalc1 − Wheatcont | 80.070 | 2.960 | 27.048 | <0.001*** |
| WheatEnt0.1 − WheatEnt0.01 | 10.351 | 2.960 | 3.497 | 0.039 * |
| WheatEnt1 − WheatEnt0.01 | 27.369 | 2.960 | 9.245 | <0.001*** |
| WheatTalc1 − WheatEnt0.01 | 77.648 | 2.960 | 26.230 | <0.001*** |
| WheatEnt1 − WheatEnt0.1 | 17.018 | 2.960 | 5.749 | <0.001*** |
| WheatTalc1 − WheatEnt0.1 | 67.297 | 2.960 | 22.733 | <0.001*** |
| WheatTalc1 − WheatEnt1 | 50.279 | 2.960 | 16.984 | <0.001*** |

Statistical significance codes: 0* 0.001  0.01 *

Method for Assessing Flowability/Plantability
   Same as for example 1.
Results
   Differences in flowability/plantability from the treated wheat seed are observed relative to controls.
6. Oilseed Rape (OSR)
   Objective: to assess the adhesion properties for Entostat at a range of loadings using oilseed rape (*Brassica napus*).
Study Outline
   Same as for example 1.
Test Item Details
   Steps in Air Milling are the same as for example 1 with the exception that Entostat was combined with oilseed rape seed at three loadings (see below). Oilseed Rape seed (Sesame, LS Plant Breeding) was supplied by Ebbage Seeds Ltd. (Downham Market, Norfolk)

REFERENCE ITEM DETAILS

Oilseed Rape (Sesame, LS Plant Breeding) pre-treated with Modesto (Bayer CropScience AG, Monheim am Rhein, Germany)
Talc-Simple Talc, Unscented, Johnsons
Treatments
1. Oilseed Rape treated with 0.01% Entostat (by mass)
2. Oilseed Rape treated with 0.1% Entostat (by mass)
3. Oilseed Rape treated with 1% Entostat (by mass)
4. Oilseed Rape treated with 1% Talc (by mass)
5. Oilseed Rape, untreated
   All treatments were replicated three times
Test System
   Apparatus: same as that used in example 1.
Sample
   A sample must consist of at least 500 g+/−5% of seeds. The thousand grain weight (TGW) of the seeds is listed below:

| Seed Type | Thousand Grain Weight g (TGW) |
|---|---|
| Oilseed Rape | 2.9 |

Samples were prepared in block bottom bags as described in example 1, and tested in The Netherlands.
Sample Schedule

| sample number | Crop | Treatment | % age | by mass | Replicate |
|---|---|---|---|---|---|
| 1 | OSR | untreated control | n/a | n/a | 1 |
| 2 | OSR | untreated control | n/a | n/a | 2 |
| 3 | OSR | untreated control | n/a | n/a | 3 |
| 4 | OSR | Entostat ™ | 0.01 | 0.05 | 1 |
| 5 | OSR | Entostat ™ | 0.01 | 0.05 | 2 |
| 6 | OSR | Entostat ™ | 0.01 | 0.05 | 3 |
| 7 | OSR | Entostat ™ | 0.1 | 0.5 | 1 |
| 8 | OSR | Entostat ™ | 0.1 | 0.5 | 2 |
| 9 | OSR | Entostat ™ | 0.1 | 0.5 | 3 |
| 10 | OSR | Entostat ™ | 1.0 | 5 | 1 |
| 11 | OSR | Entostat ™ | 1.0 | 5 | 2 |
| 12 | OSR | Entostat ™ | 1.0 | 5 | 3 |
| 13 | OSR | Commercial | n/a | n/a | 1 |
| 14 | OSR | Commercial | n/a | n/a | 2 |
| 15 | OSR | Commercial | n/a | n/a | 3 |
| 16 | OSR | Talc | 1.0 | 5 | 1 |
| 17 | OSR | Talc | 1.0 | 5 | 2 |
| 18 | OSR | Talc | 1.0 | 5 | 3 |

Commercial Seed Treatments Used: Modesto on oilseed rape

Figure 4:
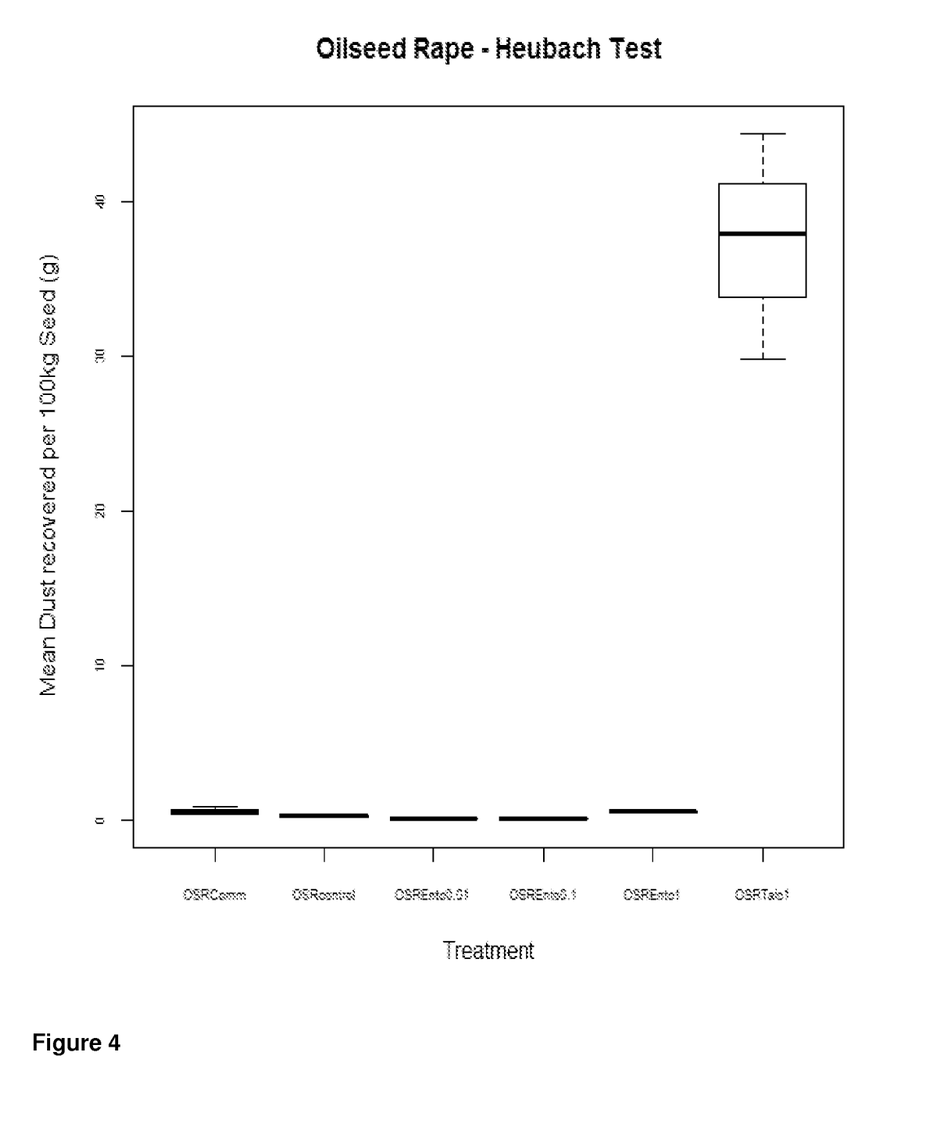
FIG. 4: (oilseed rape) Boxplot of Heubach Test Results

Procedure: see the guidelines defined by European Seed Association STAT Dust Working Group, (Version 1.0, 23 Mar. 2011).
Laboratory Conditions
   The test was performed in a laboratory (separated from the treating area) at 20° C. to 25° C. and 30% to 70% relative humidity free of free floating dust particles.
Calibration
   No calibration is necessary before measurement. Air flow rate, time of measurements and rotational settings are checked on a routine basis (every 2-3 years) by the technical service of the manufacturer or an equivalent qualified technical service.
Apparatus Preparation
   Same as for example 1.
Parameter Settings
   Same as for example 1.
Sample Preparation
   Same as for example 1.
Measurement
   Same as for example 1.
Evaluation and Calculation of Results
   Same as for example 1.
   Results are shown in FIG. 4.
Simultaneous Tests for General Linear Hypotheses

| Source | DF | SS | MS | F | P |
|---|---|---|---|---|---|
| Treatment | 5 | 3426.83 | 685.37 | 76.66 | >0.0001 |
| Error | 12 | 107.28 | 8.94 | | |
| Total | 17 | 3534.11 | | | |

Multiple Comparisons of Means: Tukey Contrasts
Grouping Information Using Tukey Method

| Treatment | N | Mean | Grouping |
|---|---|---|---|
| OSRTalc1 | 3 | 37.339 | A |
| OSREnto1 | 3 | 0.589 | B |
| OSRComm | 3 | 0.576 | B |
| OSRcontrol | 3 | 0.260 | B |
| OSREnto0.1 | 3 | 0.088 | B |
| OSREnto0.01 | 3 | 0.083 | B |

Means that do not share a letter are significantly different.
Linear Hypotheses:

| | Estimate | Std. Error | t value | Pr(>|t|) |
|---|---|---|---|---|
| OSRcont − OSRComm | 0.316 | 2.441 | 0.130 | 1.000 |
| OSREnt0.01 − OSRComm | 0.493 | 2.441 | 0.202 | 1.000 |
| OSREnt0.1 − OSRComm | 0.488 | 2.441 | 0.200 | 1.000 |
| OSREnt1 − OSRComm | 0.013 | 2.441 | 0.005 | 1.000 |
| OSRTalc1 − OSRComm | 36.762 | 2.441 | 15.059 | <1e−06*** |
| OSREnt0.01 − OSRcont | 0.176 | 2.441 | 0.072 | 1.000 |
| OSREnt0.1 − OSRcont | 0.172 | 2.441 | 0.071 | 1.000 |
| OSREnt1 − OSRcont | 0.329 | 2.441 | 0.135 | 1.000 |
| OSRTalc1 − OSRcont | 37.078 | 2.441 | 15.188 | <1e−06*** |
| OSREnt0.1 − OSREnt0.01 | 0.004 | 2.441 | 0.002 | 1.000 |
| OSREnt1 − OSREnt0.01 | 0.506 | 2.441 | 0.207 | 1.000 |
| OSRTalc1 − OSREnt0.01 | 37.255 | 2.441 | 15.261 | <1e−06*** |
| OSREnt1 − OSREnt0.1 | 0.501 | 2.441 | 0.205 | 1.000 |
| OSRTalc1 − OSREnt0.1 | 37.251 | 2.441 | 15.259 | <1e−06*** |
| OSRTalc1 − OSREnt1 | 36.749 | 2.441 | 15.053 | <1e−06*** |

Statistical significance code: 0***
Ent = Entostal ® Trade mark of Exosect Limited for carnauba wax particles
OSRCOmm = commercial oilseed rape seed
OSRcont = oilseed rape control Method for Assessing Flowability/Plantability
   Same as that for example 1.
Results
   Differences in flowability/plantability from treated oilseed rape seed are observed relative to controls.

The invention claimed is:
1. A method of controlling the flowability of plant seeds by placing the plant seeds of a mass of seeds in contact with dry free flowing particles of a flowability enhancing agent that is made up of at least one species of electret particle made up of a wax, wherein the electret particle adheres more firmly to the plant seeds than do particles that comprise a dry free flowing substance that is or includes a mineral earth component.
2. The method according to claim 1, wherein the wax comprises at least one species of wax selected from mineral waxes, natural waxes and synthetic waxes.

3. The method according to claim 1, wherein the wax comprises at least one species of wax that has a melting temperature of ≥40° C.

4. The method according to claim 2, wherein the wax comprises at least one species of wax selected from carnauba wax, montan wax, paraffin wax and a mixture of two or more thereof.

5. The method according to claim 1, wherein the plant seeds are selected from seeds from the group consisting of fodder and forage plant seeds, cereal seeds, cotton seeds, legume plant seeds, maize seeds and field crop plant seeds.

6. A method of controlling dust drift from a population of plant seeds by placing the plant seeds of a mass of seeds in contact with dry free flowing particles of a flowability enhancement agent made up of electret particles made of a wax that adheres more firmly to plant seeds than a dry particulate compound or composition that is a flowability enhancement agent that comprises a dry free flowing substance that is a mineral earth or includes a mineral earth component.

7. The method according to claim 6, wherein the wax comprises at least one species of wax selected from mineral waxes, natural waxes and synthetic waxes.

8. The method according to claim 6, wherein the wax comprises at least one species of wax that has a melting temperature of ≥40° C.

9. The method according to claim 7, wherein the wax comprises at least one species of wax selected from carnauba wax, montan wax, paraffin wax and a mixture of two or more thereof.

10. The method according to claim 6, wherein the plant seeds are selected from seeds from the group consisting of fodder and forage plant seeds, cereal seeds, cotton seeds, legume plant seeds, maize seeds and field crop plant seeds.

11. The method according to claim 1, wherein the electret particles of wax have a volume mean diameter of any conventional size in the range from 10 μm to 200 μm.

12. The method according to claim 6, wherein the electret particles of wax have a volume mean diameter of any conventional size in the range from 10 μm to 200 μm.

\* \* \* \* \*